United States Patent
Su et al.

(10) Patent No.: US 10,712,028 B2
(45) Date of Patent: Jul. 14, 2020

(54) AIR PURIFIER WITH EXTENDED HUMIDITY WORKING RANGE

(71) Applicant: KONINKLIJKE PHILIPS N.V., Eindhoven (NL)

(72) Inventors: Jing Su, Eindhoven (NL); Rui Ke, Eindhoven (NL); Ming Sun, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 214 days.

(21) Appl. No.: 16/064,479

(22) PCT Filed: Dec. 23, 2016

(86) PCT No.: PCT/EP2016/082610
§ 371 (c)(1),
(2) Date: Jun. 21, 2018

(87) PCT Pub. No.: WO2017/109206
PCT Pub. Date: Jun. 29, 2017

(65) Prior Publication Data
US 2019/0003730 A1 Jan. 3, 2019

(30) Foreign Application Priority Data
Jan. 8, 2016 (EP) .................................... 16150666

(51) Int. Cl.
*B01D 53/02* (2006.01)
*F24F 3/16* (2006.01)
*F24F 11/30* (2018.01)
*F24F 13/28* (2006.01)
(Continued)

(52) U.S. Cl.
CPC ............ *F24F 3/1603* (2013.01); *F24F 11/30* (2018.01); *F24F 13/28* (2013.01); *F24F 2110/20* (2018.01); *F24F 2110/50* (2018.01)

(58) Field of Classification Search
CPC ........ F24F 11/30; F24F 13/28; F24F 2110/20; F24F 2110/50; F24F 3/1603
See application file for complete search history.

(56) References Cited

U.S. PATENT DOCUMENTS 4,299,599 A * 11/1981 Takeyama ................. C02F 1/18
  96/122
4,365,979 A * 12/1982 Takeyama ............... B01D 53/26
  96/123

(Continued)

FOREIGN PATENT DOCUMENTS

DE   1020140103609 A1   9/2015
JP         4158134 A    6/1992
(Continued)

*Primary Examiner* — Christopher P Jones

(57) ABSTRACT

Presented is a device (100) for filtering air, comprising: an air filter (101) comprising: a first component (102) adapted for filtering air having a humidity level falling within a first humidity level range; and a second component (103) adapted for filtering air having a humidity level falling within a second humidity level range; a control system (106) configured for: receiving a sensed relative humidity of air, and selecting the first (102) or the second (103) component for filtering the air, depending on the sensed relative humidity of the air.

15 Claims, 6 Drawing Sheets

(51) Int. Cl.
  *F24F 110/50*  (2018.01)
  *F24F 110/20*  (2018.01)

(56) References Cited

U.S. PATENT DOCUMENTS

| | | | | |
|---|---|---|---|---|
| 4,943,827 A | * | 7/1990 | Good | G03B 27/32 |
| | | | | 355/27 |
| 4,965,573 A | * | 10/1990 | Gallagher | G01P 5/10 |
| | | | | 244/181 |
| 5,281,815 A | * | 1/1994 | Even-Tov | G01J 5/60 |
| | | | | 250/339.04 |
| 2006/0156927 A1 | | 7/2006 | Udagawa | |
| 2008/0019861 A1 | | 1/2008 | Silderhuis | |
| 2009/0081804 A1 | | 3/2009 | Tuchman | |
| 2011/0273505 A1 | | 11/2011 | Horiba | |
| 2014/0216259 A1 | | 8/2014 | Iwaki | |
| 2015/0354874 A1 | | 12/2015 | Cur | |
| 2017/0341001 A1 | * | 11/2017 | Jousma | B01D 53/00 |

FOREIGN PATENT DOCUMENTS

| | | |
|---|---|---|
| JP | 2000310437 A | 11/2000 |
| JP | 2002370525 | 12/2002 |
| JP | 2012254239 A | 12/2012 |
| KR | 20130068035 A | 6/2013 |
| WO | 2015191669 A2 | 12/2015 |

\* cited by examiner

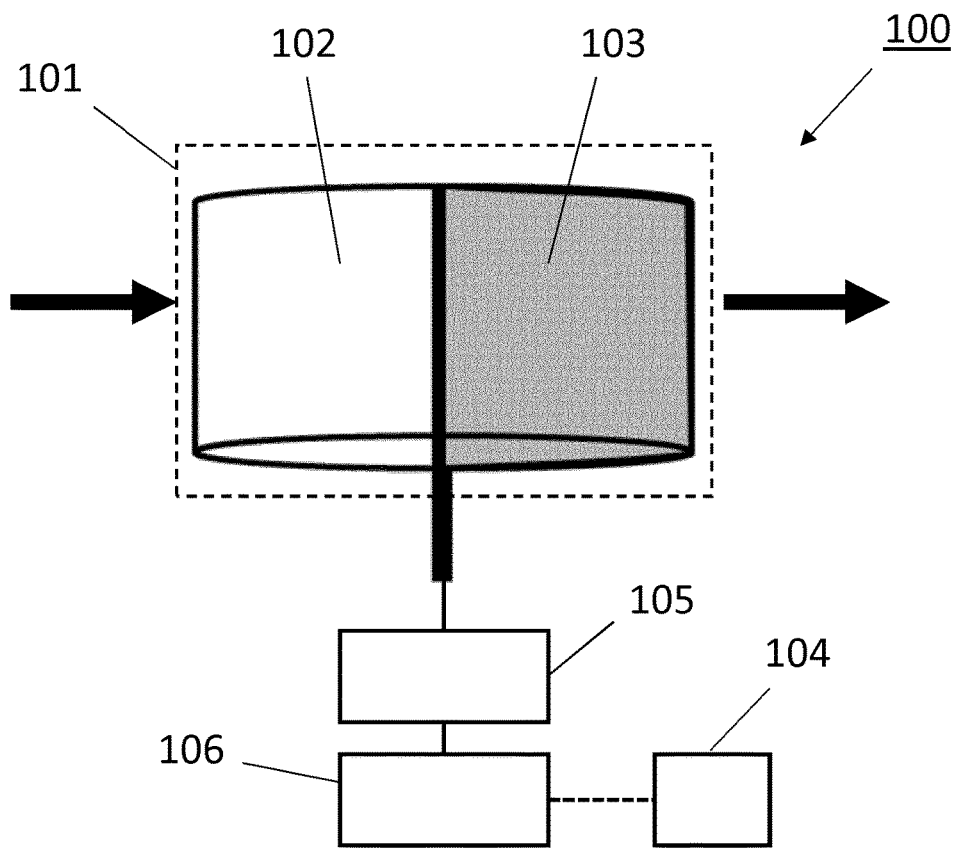
FIG 1
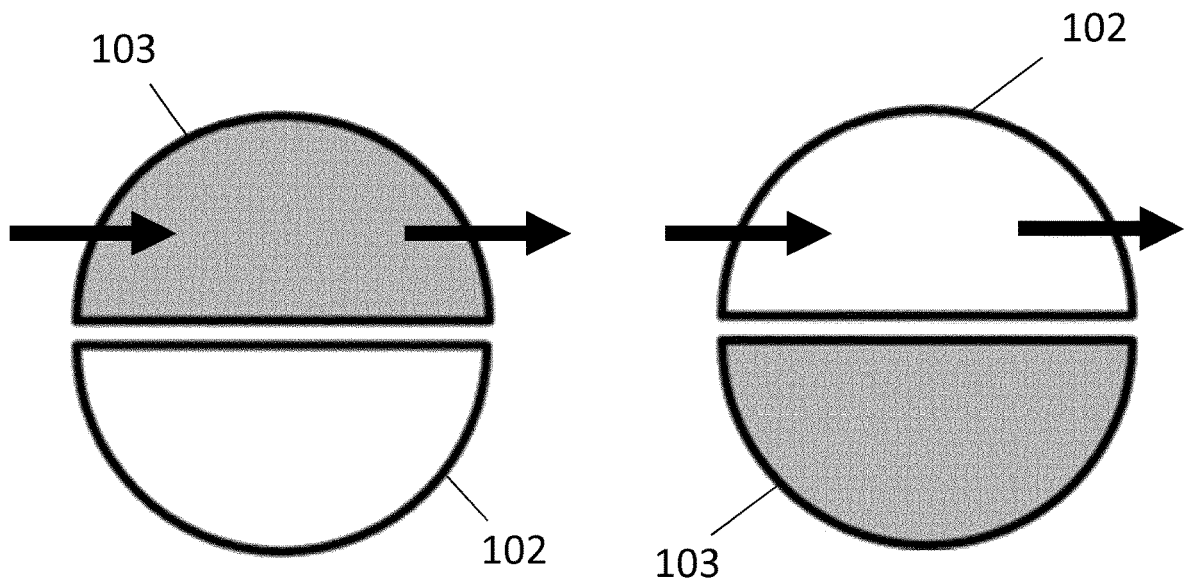
FIG 2
FIG 3

AIR PURIFIER WITH EXTENDED HUMIDITY WORKING RANGE

This application is the U.S. National Phase application under 35 U.S.C. § 371 of International Application No. PCT/EP2016/082610, filed on Dec. 23, 2016, which claims the benefit of International Application No. PCT/CN2015/098675 filed Dec. 24, 2015 and International Application No. 16150666.2 filed Jan. 8, 2016. These applications are hereby incorporated by reference herein.

FIELD OF THE INVENTION

The present invention relates to air treatment devices such as air purifiers or air humidifiers/dehumidifiers in an air purification device. In particular, the present invention relates to devices for purifying air which are efficient under a wide range of air humidity levels.

BACKGROUND OF THE INVENTION

State of the art air purifiers use different techniques for removing gas pollutants from air. For example, activated carbon adsorption, thermal catalytic oxidation (TCO), chemisorption, plasma oxidation, photocatalytic oxidation (PCO), are commonly used gas abatement techniques.

A problem related to these techniques is that their efficiency depends on particular parameters of the air, such as humidity, temperature, etc. For example, the activated carbon adsorption technique is not efficient when the relative humidity (RH) of air is higher than 70%. The efficiency of the chemisorption technique is very low when the RH of air is below 30%. Thermal catalytic oxidation, more specifically, low cost TCO material such as $MnO_x$-based metal oxide materials, show high activity of formaldehyde abatement at room temperature under low RH (<30%). However, under high RH, the material shows deactivation/poisoning due to the through strong adsorption on the active sites, especially at low temperatures.

DE 10 2014 103609 A1 describes an air filtering system which uses an air quality parameter to adapt its functionality. DE 10 2014 103609 A1 does not discuss the issue of filtering efficiency at changing RH levels of air in a room.

US 2014/0216259 A1 describes an air purifier including a humidifation filter. When humidity is low, the amount of air generated by air blowers inside the device is increased. When humidity is high, the amount of air generated by the air blowers inside the device is decreased. US 2014/0216259 A1 does not discuss the issue of filtering efficiency at changing RH levels of air in a room.

As indoor humidity is variable, there is a need for a highly efficient air purifying device, capable of working at a wide range of air humidity levels.

SUMMARY OF THE INVENTION

In a first aspect of the invention, a device for filtering air is presented, comprising: an air filter comprising: a first component adapted for filtering air having a humidity level falling within a first humidity level range; and a second component adapted for filtering air having a humidity level falling within a second humidity level range different from the first humidity level range; a control system configured for: receiving a sensed relative humidity of air, and selecting the most efficient component for filtering the air from the first or the second component for filtering the air, depending on the sensed relative humidity of the air and depending on filtering efficiency of the first (102) and the second (103) component for the sensed relative humidity of the air.

According to embodiments, the air filter comprises at least a third component and the control system is further configured to select the first, the second or the at least one third component for filtering the air, depending on the sensed relative humidity of the air.

According to an embodiment of the invention, the air filter is moveable such that the first or the second component can be selected and moved into an air flow path.

According to an embodiment of the invention, the air filter is rotatable such that the first or the second component can be selected by rotating the air filter such that the first or the second component are positioned into the air flow path.

According to an embodiment of the invention, the device further comprises a rotor coupled to the air filter and coupled to the control system. The control system is further configured to calculate a position angle of the rotor depending on the sensed air humidity level.

According to an embodiment of the invention, the air filter has two opposing sides, one side comprising the first component and another side comprising the second component.

According to an embodiment of the invention, the device further comprises at least one other air filter positioned parallel to air filter. This other air filter comprises a first component adapted for filtering air having a humidity level falling within a first humidity level range; and a second component adapted for filtering air having a humidity level falling within a second humidity level range. This other air filter has two opposing sides, one side comprising the first component and another side comprising the second component. The other air filter may be the same as the air filter. The device is further configured such that sides of all air filters comprising the same component can be selected and rotated simultaneously towards an air flow path for filtering air with a plurality of selected similar components.

According to an embodiment of the invention, the air filter is positioned in a container. The device further comprises a means for selecting the first or the second component such that the first or the second component is positioned out of the container and into an air flow path. This means may be a mechanical system comprising a motor. The means is coupled to the control system.

According to an embodiment of the invention, the device further comprises a heating element adapted for heating the container such that a component of the air filter can be regenerated. The heating element may be metal heating element that can be heated by supplying a voltage to it. The heating element may be coupled to the control system. This allows the control system to initiate or stop heating of the container when a particular filter is moved in or outside of the container.

According to an embodiment of the invention, the device further comprises a moveable cover adapted for covering the first or the second component, depending on the sensed air humidity level, such that an uncovered component is exposed to an air flow path. To move this cover a motor may be present which is coupled to the control system.

According to an embodiment of the invention, the first component comprises a high humidity effective layer, and the second component comprises a low humidity effective layer. A third component may for example comprise a medium humidity effective layer.

According to an embodiment of the invention, the first humidity level range is a humidity range of 0 to 50% relative humidity and the second humidity level range is a humidity range of 50 to 100% relative humidity. According to another embodiment, the first humidity level range is range from 0 to 30% RH. The second humidity level range may be a range of 70 to 100% RH. One or more other components may be present to cover the RH range between 30 and 70%.

According to an embodiment of the invention, the air filter is replaceable. Thus, the air filter is removable attached inside the device and easy to be replaced by another air filter.

According to an embodiment of the invention, the device further comprises a humidity sensor for sensing the humidity level of the air.

In a second aspect of the invention, a method for filtering air is presented, comprising: providing a set of filters, each filter of the set having a different working range or efficiency regarding relative humidity of air; sensing a relative humidity of air; determining a most efficient filter type for filtering air depending on the sensed relative humidity; selecting the filter type from the set of filters; placing the filter type in an air flow path thereby filtering air with the selected filter type.

According to an embodiment of the invention, the relative humidity of air is sensed continuously and the determining, selection and placing of the filter type is done based on the continuously sensed relative humidity.

It is an advantage of the invention, that the presented air purifier is capable of performing efficient air purification at a wide range of humidity levels without manually changing the filters for different humidity values. This increases ease of use and simplifies manufacturing of the device and thereby cost.

It is an advantage of the invention that the same air purifier can be used in different parts of the world having different air humidity levels without changing filters for particular regions. This reduces cost and the manufacturing process.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1 illustrates an embodiment of the invention comprising a rotating air filter FIG. 2 illustrates a top view of an embodiment of a rotatable air filter FIG. 3 illustrates a top view of an embodiment of a rotatable air filter

Figure 4:
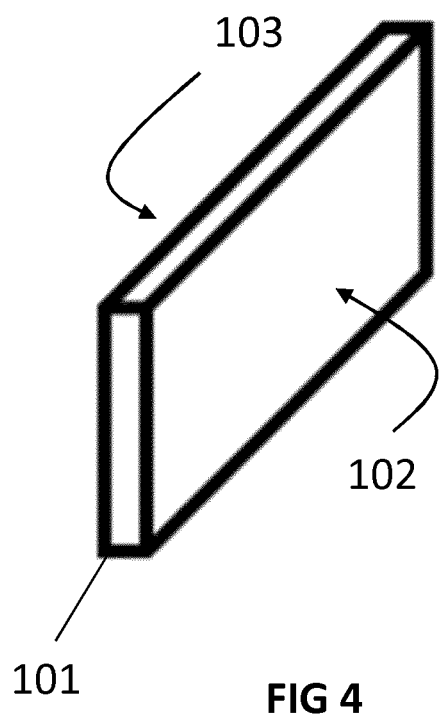
FIG. 4 illustrates an embodiment of a planar air filter

Any reference signs in the claims shall not be construed as limiting the scope.

In the different drawings, the same reference signs refer to the same or analogous elements.

DETAILED DESCRIPTION OF THE EMBODIMENTS

Throughout this description, reference is made to a first or a second component of the air filter. These components may be separate physical parts which together form the air filter. The air filter may also be one single physical part wherein different regions of the air filter are referred to as components.

The present invention solves the aforementioned problem by providing an air purifier with multiple filters, each filter being very efficient in filtering air for a particular RH of air or RH air range. The air purifier further comprises a RH sensor which continuously senses the RH of the to-be-filtered air. Further, the air purifier comprises a system that determines which filter is most suitable for filtering a pollutant from the air based on the sensed RH of the air. After this determination, the appropriate filter being the most efficient one for filtering the pollutant from air is selected and positioned in the air flow such that air is filtered by the appropriate filter.

The invention and its particular embodiments are further disclosed in detail in the paragraphs below.

In a first aspect of the invention, a device for filtering air is presented. The device comprises an air filter having a first component adapted for efficiently filtering a pollutant from air, the air having a RH falling within a first RH range. The first component may comprise a material, e.g. a chemical material, suitable for efficiently filtering air having a relative humidity below 50% (one pass efficiency of filter is over 50% under humidity below 50% with flow velocity of 1 m/s). For example, the first component may be a thermal catalytic oxidation component such as MnOx-based metal oxide materials, e.g. a MnOx-CeOx material.

The air filter further comprises a second component adapted for efficiently filtering the pollutant from air, the air having a RH falling within a second RH range, different from the first RH range. The second component may comprise a material, e.g. a chemical material, suitable for efficiently filtering air having a RH above 50%. For example, the second material may be a chemisorption component, e.g. a chemisorption layer made of β-$CaSO_4$ functional slurry. For example, in the functional slurry, 20% (w/w) tris, 10% KHCOO and 10% $KHCO_3$ are mixed for formaldehyde capture.

In other words, the first component is adapted such that it features a higher filter efficiency for a particular pollutant than the second component when RH of air is within the first RH range. The second component is adapted such that it features a higher filter efficiency for that particular pollutant than the first component when RH of air is within the second RH range. The particular pollutant may be a gas pollutant such as formaldehyde, carbon monoxide, SO2, NO, ozone, toluene, etc.

The device further comprises a control system configured for receiving a sensed relative humidity of air, and selecting the first or the second component for filtering the air, depending on the sensed relative humidity of the air. Thus, either the first or the second component is selected for filtering air based on: 1) the sensed RH value of air and 2) the filter efficiency of the first or the second component for the sensed RH of air. Thus, the most efficient filter for filtering out a particular pollutant from the air is selected depending on the RH value of the air. For example, the control system is configured for: receiving a sensed RH of air; checking whether the sensed RH value of air falls within the first or the second RH range; and selecting the first component for filtering air when the sensed relative humidity of air value falls within the first RH range; and selecting the second component for filtering air when the sensed relative humidity of air value falls within the second RH range.

The control system may be implemented in numerous ways, such as with dedicated hardware, software, or any combination of the two, to perform various functions discussed herein. A "processor" is one example of a controller which employs one or more microprocessors that may be programmed using software (e.g., microcode) to perform various functions discussed herein. The control system may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

According to an embodiment of the invention, the sensed relative humidity of air may be provided by a RH sensor which is part of the device and electrically connected to the control system. The sensor may be a commercially available RH sensor such as SHT11 (Sensirion company).

According to another embodiment of the invention, the RH sensor is not part of the device. In such an embodiment, the sensed RH of air is provided to the device wirelessly. The RH sensor may be a wireless RH sensor and the control system comprises a wireless circuitry for receiving the RH information from the RH sensor.

The air filter may comprise a plurality of components wherein each component is suitable for efficiently filtering air having a RH within a particular RH range. The RH ranges of the different components are different to allow filtering of air over a wide RH range. The selection of the most suitable component from the plurality of components is done based on the sensed RH.

According to an embodiment of the invention, the air filter is moveable. The selection of the most suitable component comprises moving the air filter such that the most suitable component is filtering the air. In this embodiment, the most suitable component is placed or positioned in the air flow path of the device while other components of the air filter are not positioned in this air flow path.

According to an embodiment of the invention, the air filter is rotatable. The air filter is attached in the device such that the first or the second component can be selected by rotating the first or the second component. This way the most suitable component can be rotated/positioned in the air path flow of the device. It is an advantage of the invention that only the most suitable component can be placed in the air flow path and good filtration can be achieved.

According to an embodiment of the invention, the device further comprises a rotor mechanically coupled to the air filter for rotating the air filter and correctly positioning the components of the air filter. The rotor is further coupled to the control system. The rotor is driven by the control system. The control system is further configured to calculate a position angle of the rotor depending on the sensed RH of air. The control system may comprise a PID controller. The control system is either electrically or wirelessly connected to the rotor and provides the calculated position angle to the rotor.

FIG. 1 illustrates such an embodiment. The device 100 comprises an air filter 101 having a first 102 and a second 103 component. Further illustrated are a RH sensor 104 coupled to a control system 106. The control system 106 is coupled to the rotor 105. The rotor 105 is coupled to the air filter 101. In this embodiment, the air filter has a cylindrical shape. The first 102 and the second 103 components together form the cylindrical shape. By placing a part of the cylindrical shape in the air flow path, air is filtered by only one component of the air filter. For example, FIG. 2 is top view of the air filter 101. It illustrates an air filter 101 being positioned such that only the second component 103 is exposed to the air flow path (indicated with black arrows). Thus, air is filtered only by the second component 103 of the air filter 101. In FIG. 3, the air filter 101 is rotated 180 degrees such that first component 102 is now positioned in the air flow path.

According to an embodiment of the invention, the air filter 101 is a planar surface having two opposing sides. Such an embodiment is illustrated in FIG. 4. One side comprises the first component 102. The other side comprises the second component 103. For example, one side is coated with a first chemical component. The other side is coated with a second chemical component. Depending on the sensed RH, the most suitable side of the air filter is positioned in the air flow path of the device. It is an advantage of the invention that such an air filter is compact and easily replaceable. The air filter may be positioned in a rotatable way in the device. The air filter may be rotatable fixed in the device. In such an embodiment, the most suitable side of the air filter is positioned in the air flow path by rotating the air filter.

According to an embodiment of the invention, to rotate the air filter, a means for rotating the air filter depending on the sensed RH of air may be present. The means is either electrically or wirelessly coupled to the RH sensor.

According to a particular embodiment, the means may be a rotor that may be directly coupled to the air filter and can directly rotate the air filter to position the first or the second component in the air flow path depending on the sensed RH of air.

Figure 5:
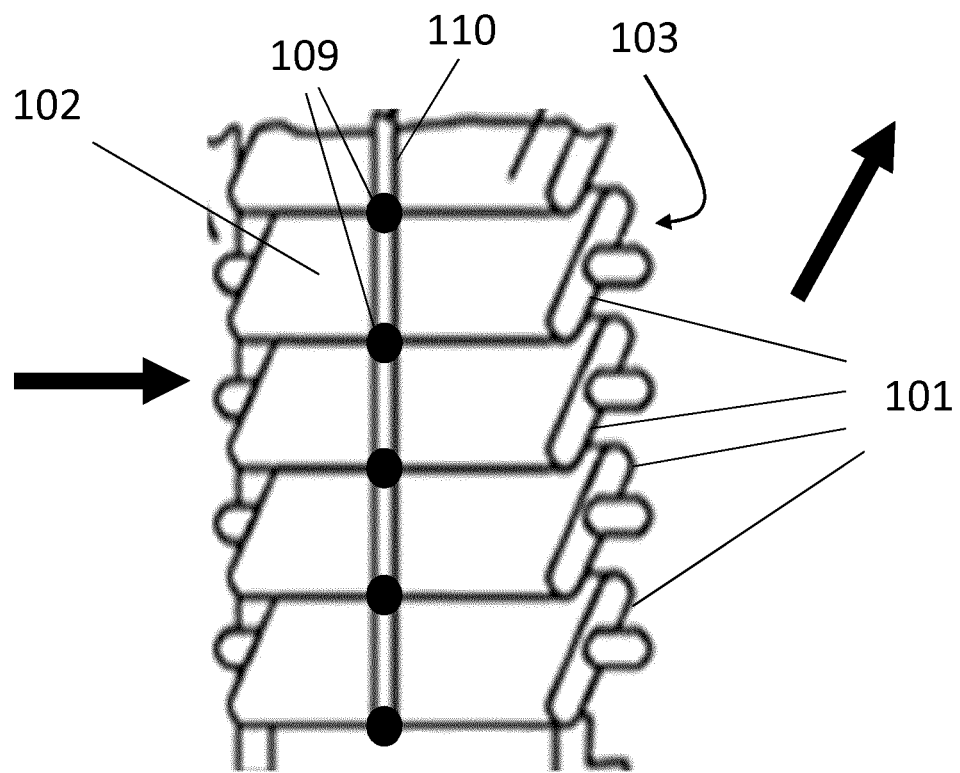
FIG. 5 illustrates an embodiment of a plurality of rotatable air filters

According to another particular embodiment, the rotor may also be indirectly coupled to the air filter via one or more rods or wires. The rods or wires may be attached to the edges of the air filter thereby allowing rotation of the air filter by moving the rods or wires up and down. FIG. 5 illustrates how a rod or wire 110 is attached to the side of the air filter 101 at a particular attachment point 109. The configuration is similar to a "window blind" configuration wherein the rotation angle of the window blind can be adjusted via wires or rods attached to the sides or edges of the window blind. It is an additional advantage that the output air flow angle of the device can also be adjusted by rotating the air filter.

According to an embodiment of the invention, the device comprises a plurality of rotatable air filters that are positioned parallel to each other. The device is further configured such that sides of the plurality of air filters comprising the same component can be selected and rotated simultaneously towards an air flow path for filtering air with a plurality of similar components. The structure of this embodiment is similar to a window blind configuration. A typical window blind is made up of several long horizontal or vertical slats of various types of hard material, including wood, plastic or metal. In this embodiment, the slats are air filters. The most suitable component, being one side of the air filter e.g. the first or the second, can be selected by rotating the air filter's side towards the air flow path. It is a further advantage of the invention that filtered air can then exit the device via the spacing between the different air filters thereby also changing the direction of air exiting the air purifier.

The simultaneous selection of the correct component of each of the plurality of air filters can be done by attaching all air filters to the same rod/wire. The rod/wire is then operated by a motor or a rotor. It is an advantage of the invention that a single motor or rotor can simultaneously select the most suitable component based on the sensed RH of the air.

Figure 6:
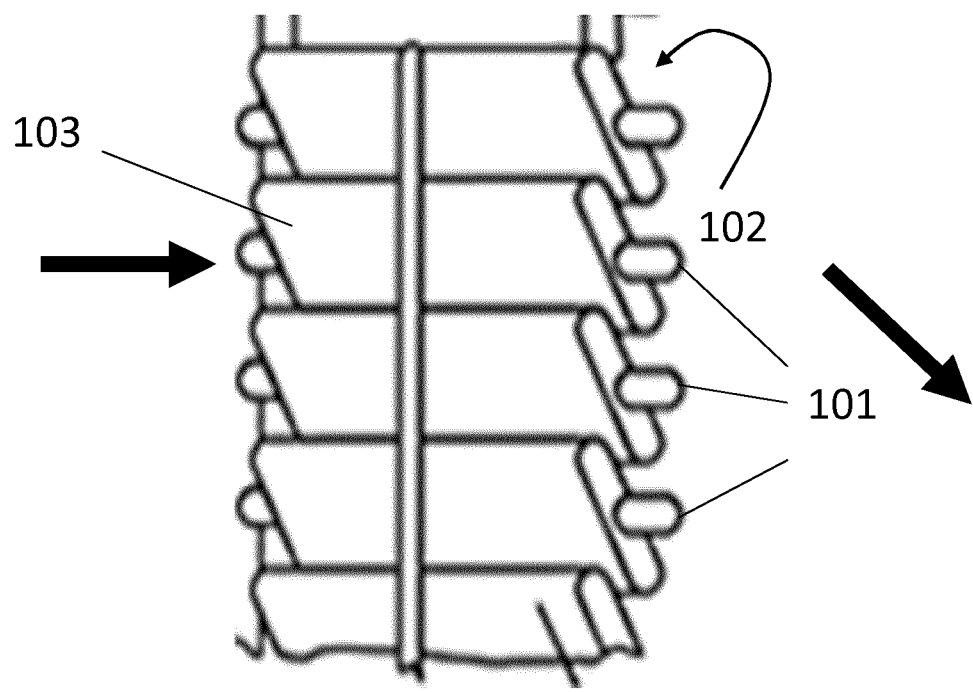
FIG. 6 illustrates an embodiment of a plurality of rotatable air filters

FIG. 5 illustrates such embodiment with a plurality of air filters. Different air filters 101 are rotatable attached in the air purifying device 100. Each air filter 101 is coated on one side with a first component 102 and on the other side with a second component 103. One edge of each air filter 101 is attached to a wire/rod 110 at an attachment point 109. By moving the rod/wire 110 up or down, the angle of the air filter 110 can be changed such that air (the air flow path being indicated by a black arrow) can be filtered by a component of the air filter. In FIG. 5, the air filters 101 are positioned/rotated such that the air flow path will break on the side of the air filters 101 comprising a first component 102. Filtered air is redirected upwards (indicated by black arrows). In FIG. 6, the air filters 101 are positioned such that the air flow path will break on the side of the air filters 101 comprising a second component 103. Filtered air is redirected downwards (indicated by black arrows).

According to an embodiment of the invention, the air filter is positioned in a container. The container may be a solid box that cannot be penetrated by air. The first and the second component of the air filter are different parts which can be moved independently of each other. For example, when the sensed RH indicates that the first component is most suitable for filtering air, the first component is selected by lifting it out of the container and placing it in the air flow path. The second component remains in the box and does not filter air. When the sensed RH indicates that the second component is most suitable for filtering air, the second component is selected by lifting it out of the container and placing it in the air flow path. The first component remains in the box and does not filter air. The moving of the components may be performed by a mechanical system coupled to the first and second component and adapted for moving or lifting the components out of the container and into the air flow path.

Figure 7:
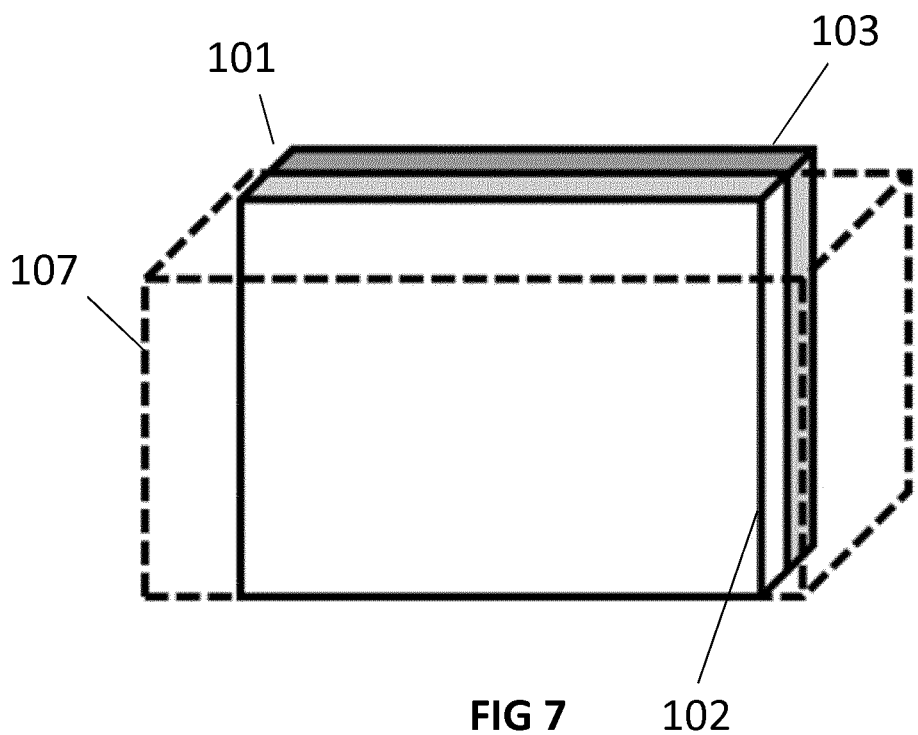
FIG. 7 illustrates an embodiment of the invention with moveable filters
Figure 8:
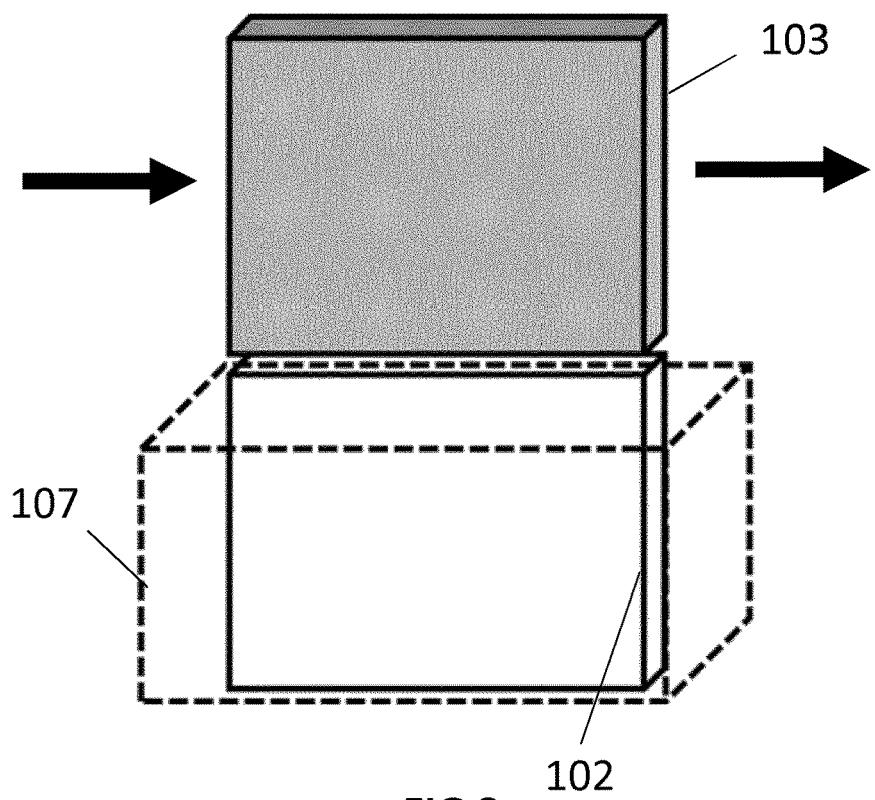
FIG. 8 illustrates an embodiment of the invention with moveable filters
Figure 9:
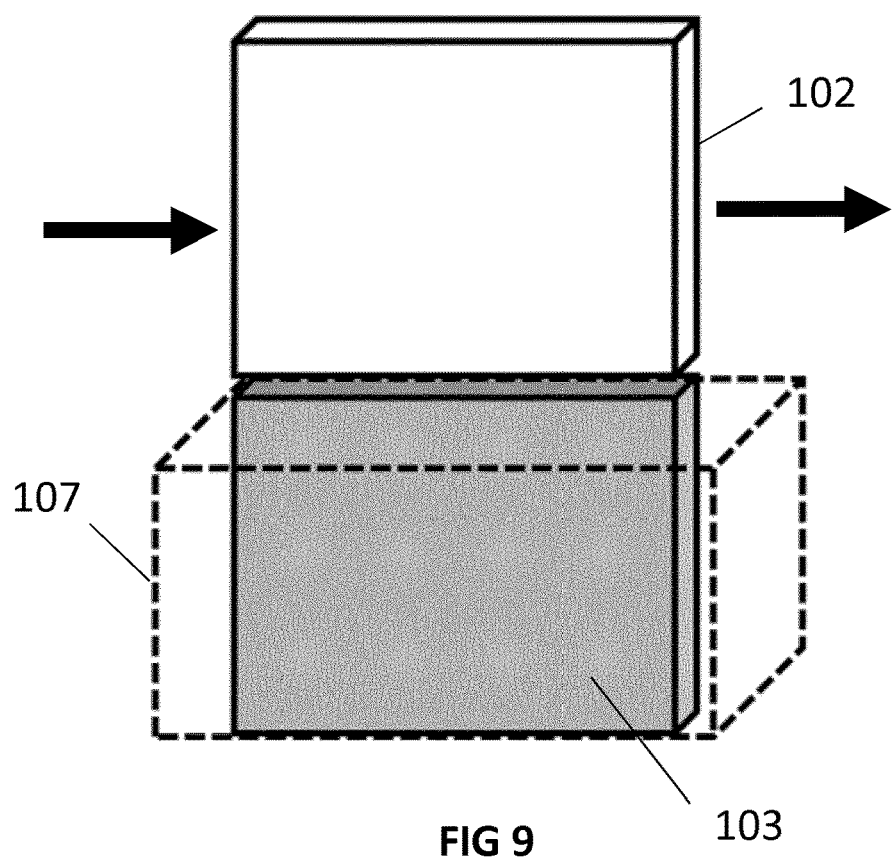
FIG. 9 illustrates an embodiment of the invention with moveable filters

FIG. 7 illustrates a container 107. An air filter 101 is present in the container 107. The air filter 101 comprises a first 102 and a second 103 component. FIG. 8 illustrates a container 107, a first 102 and a second 103 component. The second component 103 is lifted out of the container 107 and moved in the air flow path (indicated by black arrows). FIG. 9 illustrates a container 107, a first 102 and a second 103 component. The first component 102 is lifted out of the container 107 and moved in the air flow path (indicated by black arrows).

The system for moving the most suitable component out of the container may be a mechanical system comprising a motor which is driven by a controller that is coupled to the RH sensor.

According to an embodiment of the invention, the device may comprise a heating element. The heating element may be present in the container or outside of the container. The heater is used to regenerate the different components of the air filter by heating it. It is an advantage of the invention that by placing air filters in a container, good regeneration can be achieved because of the thermal insulation properties of the container. For that purpose, the walls of the container may be thermally isolated with a thermal isolating material. It is an advantage of the invention that one component of the air filter may be active for filtration by lifting it out of the container and into the air flow path. Meanwhile, the non-active component present in the container can be regenerated by heating the container. Alternatively, the container may be filled with a liquid that can regenerate or clean components of the air filter.

According to a particular embodiment of the invention, the container may comprise different air filters wherein different air filters have similar components. For example, the container may comprise at least two air filters, each air filter comprising a first and a second component. During filtration, the first component of the first air filter may be lifted out of the container for filtration purposes. Meanwhile, the first component of the second air filter can be regenerated in the container by heating. When filtration capabilities of the first component of the first air filter are exhausted, it can be retracted in the container for regeneration by heating while the first component of the second air filter may be lifted in the air flow path for filtration purposes. It is an advantage of the invention that this configuration allows filtration of air with filters which are in the best possible condition.

According to an embodiment of the invention, the device comprises a moveable cover which can partly cover the air filter. In this embodiment, the air filter is a planar structure on which a first and a second component are present. Depending on the sensed RH, the moveable cover is moved such that the most suitable component is capable of filtering air and such that other components are covered by the moveable cover. Thus, the most suitable component, determined depending on the sensed RH, is uncovered and exposed to the air flow path in the device.

Figure 10:
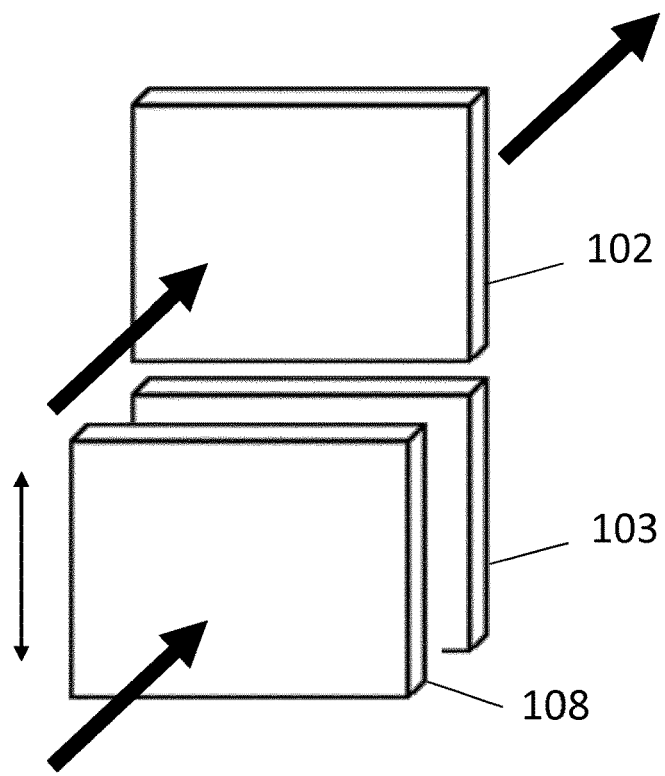
FIG. 10 illustrates an embodiment of the invention with moveable cover for selecting filters

FIG. 10 illustrates a moveable cover 108. The cover 108 is positioned in the air flow path and blocks the air flow path (indicated by black arrows) of the second component 103 of the air filter. The air flow path towards the first component 102 is not blocked. Thus, in this configuration, the first component 102 is selected as the most suitable component for filtration of air of a certain RH.

Figure 11:
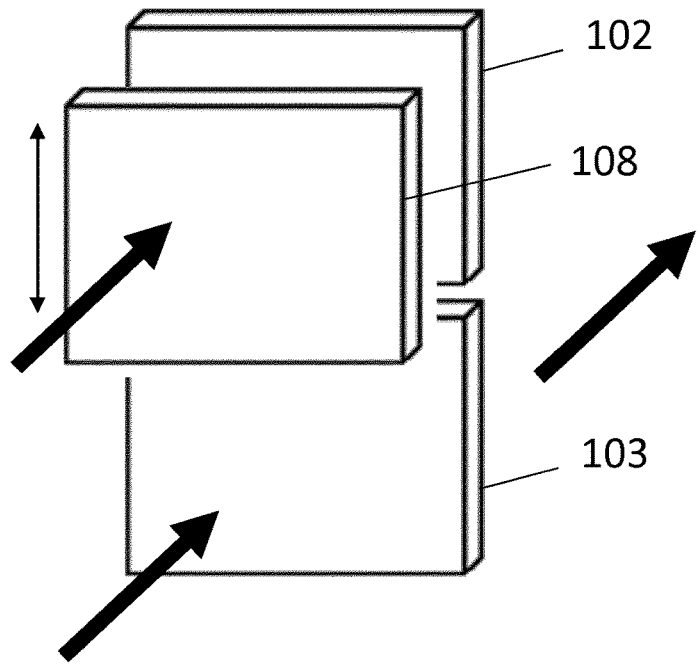
FIG. 11 illustrates an embodiment of the invention with moveable cover for selecting filters

In FIG. 11, the cover 108 is positioned in the air flow path and blocks the air flow path of the first component 102 of the air filter. The air flow path towards the second component 103 is not blocked. Thus, in this configuration, the second component 103 is selected as the most suitable component for filtration of air of a certain RH.

Figure 12:
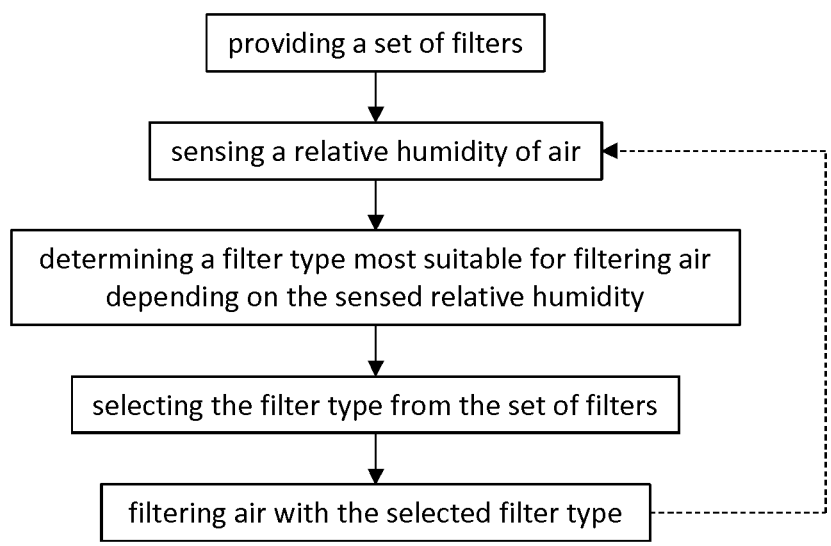
FIG. 12 illustrates a block diagram of a method for filtering air according to an embodiment of the invention The drawings are only schematic and are non-limiting. In the drawings, the size of some of the elements may be exaggerated and not drawn on scale for illustrative purposes.

According to a second aspect of the invention, a method for purifying air is presented and is illustrated in FIG. 12. The method comprises a step of providing a set of filters for filtering air. Each filter of the set having a different working range or filter efficiency for filtering out a particular pollutant from air regarding relative humidity of air. The filter set comprises a plurality of filters of different types, e.g. different types of filters for filtering out the same pollutant from the air, e.g. formaldehyde or other pollutants as described in the first aspect of the invention. Further, the relative humidity of air is sensed. The most efficient filter type for filtering out the particular pollutant is determined based on the sensed relative humidity. Thereafter, the determined filter type is selected from the set of filters and used to filter air by e.g. placing it in an air flow path.

According to an embodiments of the invention, whilst filtering air, the RH of air is sensed continuously. When the RH changes and the previously determined filter type is less suitable than another available filter type, this other filter type is selected and used for filtering air. The dashed arrow line in FIG. 12 illustrates that the RH of air is continuously sensed and that based on this sensing the filter type is determined and selected.

As described in detail above, the air filter comprises a first and a second component. The air filter may also comprise more components depending on the RH humidity range of air that must be covered by the device. The determination of which component is most suitable or efficient for filtering air having a particular RH may be done beforehand. For example, the determination of which component is most efficient for filtering a particular pollutant, e.g. formaldehyde or another pollutant, from the air having a particular RH may be done beforehand.

For example, during a test phase the components are exposed to air over a wide range of RH. The filtering efficiency of each of the components, e.g. for filtering a particular pollutant from supplied air, is measured over this wide range of RH. The filtering efficiency data may be used by the control system to determine during air purification which filter is the most suitable filter for the sensed RH. For example, the filtering efficiency data may be used by the control system to determine during air purification which filter is the most suitable filter for filtering out the particular pollutant from the air for the sensed RH of the air. For example, this filter efficiency data may be stored in a memory of the control system. The data is then accessed and checked with the sensed RH for selecting the most suitable or efficient component.

As a general rule, filters based on chemisorption work well under high humidity. Filters based on physical absorption work well under low humidity. As for filters based on catalytic oxidation, the influence of humidity varies. Some catalysts work better under low humidity such as MnOx-CeOx, CuO—MnO2. Some catalysts work better under high humidity, such as Pt/TiO2.

Apart from sensing humidity of air, the device may be modified such that other parameters of air are sensed instead. The other parameters may be, ambient pressure, temperature, the concentration of a certain gas in the air, etc. . . . Depending on these parameters, the most suitable or efficient component of the air filter is then selected for filtering air. In such embodiments, the sensor is adapted to sense that particular parameter of the air. The air filter is composed of components that are each most suitable for filtering a particular range of the sensed parameter of the air, wherein each components is different. For example, when temperature is sensed, the air filter is composed of at least two components, wherein each component is efficient for filtering air of a different temperature range. For example, a first component may be efficient in filtering air having a temperature within a range of 0 to 15 degrees Celsius while a second component may be more efficient in filtering air having a temperature within a range of 15 to 30 degrees Celsius. The same principle applies to other sensed parameters of air. The determination of the efficiency of the filter for each range of a parameter may be done beforehand using the test phase as described above.

The invention claimed is:

1. A device for filtering air, comprising:
an air filter comprising: a first and a second component for filtering air; and
a control system configured for receiving a sensed relative humidity of air,
wherein:
the first component is adapted for filtering air having a humidity level falling within a first humidity level range;
the second component is adapted for filtering air having a humidity level falling within a second humidity level range different from the first humidity level range; and
wherein the control system is further configured for selecting the most efficient component for filtering the air from the first or the second component depending on the sensed relative humidity of the air and depending on filtering efficiency of the first and the second component for the sensed relative humidity of the air.

2. The device according to claim 1, wherein the air filter is moveable such that the first or the second component can be selected and moved into an air flow path.

3. The device according to claim 1, wherein the air filter is rotatable such that the first or the second component can be selected by rotating the first or the second component into or towards an air flow path.

4. The device according to claim 3, further comprising a rotor coupled to the air filter and the control system, and wherein the control system is further configured to calculate a position angle of the rotor depending on the sensed air humidity level.

5. The device according to claim 1, wherein the air filter has two opposing sides, one side comprising the first component and the other side comprising the second component.

6. The device according to claim 5, further comprising at least one other air filter positioned parallel to the air filter, and wherein the device is further configured such that sides of all air filters comprising the same component can be selected and rotated simultaneously towards an air flow path for filtering air with a plurality of similar selected components.

7. The device according to claim 1, wherein the air filter is positioned in a container, and further comprising a mechanical system for selecting the first or the second component such that the first or the second component is positioned out of the container in an air flow path.

8. The device according to claim 7, further comprising a heating element adapted for heating the container such that a component of the air filter can be regenerated.

9. The device according to claim 1, further comprising a moveable cover adapted for covering the first or the second component, depending on the sensed air humidity level, such that an uncovered component is exposed to an air flow path.

10. The device according to claim 1, wherein the first component comprises a high humidity effective layer, and wherein the second component comprises a low humidity effective layer.

11. The device according to claim 1, wherein the first humidity level range is a humidity range of 0 to 50% relative humidity and wherein the second humidity level range is a humidity range of 50 to 100% relative humidity.

12. The device according to claim 1, wherein the air filter is replaceable.

13. The device according to claim 1, further comprising a humidity sensor for sensing the humidity level of the air.

14. A method for filtering air, comprising:
providing a set of filters, each filter of the set having a different working range regarding relative humidity of air;
sensing a relative humidity of air;
selecting the filter type from the set of filters;
wherein:
the method further comprises:
determining a most efficient filter type for filtering air depending on the sensed relative humidity; and
placing the filter type in an air flow path.

15. The method according to claim 14, wherein the relative humidity of air is sensed continuously and wherein the determining, selection and placing of the filter type is done based on the continuously sensed relative humidity.

* * * * *